(12) United States Patent
Lin et al.

(10) Patent No.: US 12,494,872 B2
(45) Date of Patent: Dec. 9, 2025

(54) APPARATUS AND METHOD FOR A HYBRID AUTOMATIC REPEAT REQUEST FEEDBACK TRANSMISSION

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 18/066,888

(22) Filed: Dec. 15, 2022

(65) Prior Publication Data
US 2023/0216616 A1 Jul. 6, 2023

Related U.S. Application Data

(63) Continuation of application No. PCT/CN2020/107485, filed on Aug. 6, 2020.

(51) Int. Cl.
*H04L 1/1829* (2023.01)
*H04L 5/00* (2006.01)
*H04W 74/0833* (2024.01)
*H04L 1/1812* (2023.01)
*H04W 4/06* (2009.01)

(52) U.S. Cl.
CPC .......... *H04L 1/1861* (2013.01); *H04L 5/0055* (2013.01); *H04W 74/0833* (2013.01); *H04L 1/1812* (2013.01); *H04W 4/06* (2013.01)

(58) Field of Classification Search
CPC ... H04L 1/1861; H04L 5/0055; H04L 1/1812; H04L 1/1864; H04L 1/1854; H04L 2001/0093; H04W 74/0833; H04W 4/06; H04W 52/146; H04W 52/50
USPC .......................................................... 370/329
See application file for complete search history.

(56) References Cited

U.S. PATENT DOCUMENTS

| | | | |
|---|---|---|---|
| 8,654,661 B2 | 2/2014 | Wang | |
| 10,057,921 B2 | 8/2018 | Sun | |
| 10,728,925 B2 | 7/2020 | Sun | |
| 2010/0226263 A1* | 9/2010 | Chun | H04L 1/0027 370/312 |

(Continued)

FOREIGN PATENT DOCUMENTS

| | | |
|---|---|---|
| EP | 2053761 B1 | 8/2010 |
| WO | 2014183279 A1 | 11/2014 |
| WO | 2017078870 A1 | 5/2017 |

OTHER PUBLICATIONS

Supplementary European Search Report issued in the corresponding European application No. 20948637.2, mailed on Feb. 7, 2023.

(Continued)

*Primary Examiner* — Mang Hang Yeung
(74) *Attorney, Agent, or Firm* — Ladas & Parry, LLP

(57) ABSTRACT

An apparatus and a method for a hybrid automatic repeat request (HARQ) feedback transmission are provided. A method for a HARQ feedback transmission includes receiving a multicast broadcast service (MBS) transport block (TB) from a base station, decoding the MBS TB, and transmitting, to the base station, a HARQ feedback in a form of a negative acknowledgement (NACK)-only report when the UE incorrectly decodes the MBS TB.

20 Claims, 2 Drawing Sheets

(56) References Cited

U.S. PATENT DOCUMENTS

| | | |
|---|---|---|
| 2010/0278093 A1 | 11/2010 | Wang |
| 2012/0281647 A1 | 11/2012 | Kuo |
| 2016/0119762 A1* | 4/2016 | Zhu ..................... H04B 7/0452 370/312 |
| 2017/0127442 A1 | 5/2017 | Sun et al. |
| 2018/0115430 A1 | 4/2018 | Seo |
| 2018/0338322 A1 | 11/2018 | Sun et al. |
| 2023/0040690 A1* | 2/2023 | Chen ..................... H04L 5/0053 |

OTHER PUBLICATIONS

International Search Report in the international application No. PCT/CN2020/107485, mailed on Apr. 26, 2021.
Written Opinion of the International Search Authority in the international application No. PCT/CN2020/107485, mailed on Apr. 26, 2021.
First Office Action of the corresponding European application No. 20948637.2, issued on May 15, 2025.

* cited by examiner

APPARATUS AND METHOD FOR A HYBRID AUTOMATIC REPEAT REQUEST FEEDBACK TRANSMISSION

CROSS REFERENCE TO RELATED APPLICATION

This is a continuation application of International Patent Application No. PCT/CN2020/107485, filed on Aug. 6, 2020, entitled "APPARATUS AND METHOD FOR A HYBRID AUTOMATIC REPEAT REQUEST FEEDBACK TRANSMISSION", the disclosure of which is hereby incorporated by reference in its entirety.

BACKGROUND OF DISCLOSURE

1. Description of the Related Art

During the past development of 5th generation—new radio (5G-NR) radio access technology (RAT) system and network under 3rd generation partnership project (3GPP) in Release 15 and Release 16, 5G multicast and broadcast types of services are not part of the main focus of effort, despite there are a few important use cases for which multicast/broadcast could provide substantial broadening to the range of applications and improvements for the user experience. In Release 17, 3GPP is now looking to introduce new radio transceiver functions/techniques and incorporating them into 5G-NR radio access network (RAN) in order to provide multicast/broadcast services to support applications such as public safety, mission critical, vehicle-to-everything (V2X), internet protocol TV (IPTV), group communications, and/or internet of things (IoT).

According to the approved 3GPP work item description, one of main operating requirements for the 5G-NR RAN to support multicast/broadcast services is to be able to deliver service contents to user equipment (UE) in any one of the existing defined radio resource control (RRC) states (i.e., idle, inactive, and connected states). To achieve/satisfy this requirement, there are currently inefficiencies in the existing NR radio system design to reliably provide multicast/broadcast contents especially for UEs in RRC idle and inactive states. These inefficiencies include poor downlink (DL) data reception performance, from lack of channel state information and hybrid automatic repeat request (HARQ) feedbacks available at a gNB and long packet latency delays, due to unnecessary/excessive blind retransmissions of data packets if following the existing physical broadcast channel content delivery mechanism.

Furthermore, since the number of UEs that require multicast/broadcast service in a network cell could be quite large for applications such as V2X, IoT, sports events (in and nearby stadiums), and/or even sometimes public safety/mission critical users, it would be impossible to connect and serve this large number of UEs at the same time by a single gNB base station. How to solve the above issues is still a challenge.

Therefore, there is a need for an apparatus and a method for a hybrid automatic repeat request (HARQ) feedback transmission, which can solve issues in the prior art, decrease a required number of feedback resources, save UE processing and uplink (UL) transmissions, provide more reliable reception of MBS data with lower latency, provide better user experience, provide a good communication performance, and/or provide high reliability.

SUMMARY

The present disclosure relates to the field of communication systems, and more particularly, to an apparatus and a method for a hybrid automatic repeat request (HARQ) feedback transmission. An object of the present disclosure is to propose an apparatus and a method for a hybrid automatic repeat request (HARQ) feedback transmission.

In a first aspect of the present disclosure, a user equipment (UE) includes a memory, a transceiver, and a processor coupled to the memory and the transceiver. The transceiver is configured to receive a multicast broadcast service (MBS) transport block (TB) from a base station, the processor is configured to decode the MBS TB, and the transceiver transmits, to the base station, a hybrid automatic repeat request (HARQ) feedback in a form of a negative acknowledgement (NACK)-only report when the processor incorrectly decodes the MBS TB.

In a second aspect of the present disclosure, a method for a hybrid automatic repeat request (HARQ) feedback transmission of a user equipment includes receiving a multicast broadcast service (MBS) transport block (TB) from a base station, decoding the MBS TB, and transmitting, to the base station, a HARQ feedback in a form of a negative acknowledgement (NACK)-only report when the UE incorrectly decodes the MBS TB.

In a third aspect of the present disclosure, a base station includes a memory, a transceiver, and a processor coupled to the memory and the transceiver. The transceiver is configured to transmit, to a user equipment (UE), a multicast broadcast service (MBS) transport block (TB) and the transceiver receives, from the UE, a hybrid automatic repeat request (HARQ) feedback in a form of a negative acknowledgement (NACK)-only report when the UE incorrectly decodes the MBS TB.

In a fourth aspect of the present disclosure, a method for a hybrid automatic repeat request (HARQ) feedback transmission of a base station includes transmitting, to a user equipment (UE), a multicast broadcast service (MBS) transport block (TB) and receiving, from the UE, a hybrid automatic repeat request (HARQ) feedback in a form of a negative acknowledgement (NACK)-only report when the UE incorrectly decodes the MBS TB.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, a feasible way to provide multicast/broadcast services for applications such as vehicle-to-everything (V2X), internet of things (IoT), sports events (in and nearby stadiums), and/or even sometimes public safety/mission critical users is to allow radio resource control (RRC) idle and inactive UEs to receive data packets without any active connections. As such, two radio communication inefficiencies and challenges described above in the prior art for delivering data contents to UEs in idle/inactive states should be resolved.

In some embodiments of the present disclosure, for the present inventive HARQ feedback reporting mechanism, it aims to improve a downlink (DL) data reception performance for UEs operating in RRC idle and inactive states by feeding back, to a gNB, negative acknowledgement (NACK) reports only when DL data packets are not decoded successfully. This also helps to reduce multicast/broadcast content delivery latency by retransmitting the same data packets to UEs only when it is necessary. By utilizing a sequence-based signal, this allows the UEs to share a common or a set of common physical random-access channel (PRACH) resources and random-access (RA) preambles, which are configured by a network, to represent NACK information. And thus, this greatly improves utilization efficiency of uplink (UL) resources. Other benefits of adopting the newly invented downlink HARQ reporting mechanism for UEs in RRC idle and inactive states:

Greatly enhanced user experience from better reception performance and shortened data latency.

Reduced UE processing and power consumption in the uplink feedback preparation.

Simplified HARQ feedback detection process at the gNB receiver.

Figure 1:
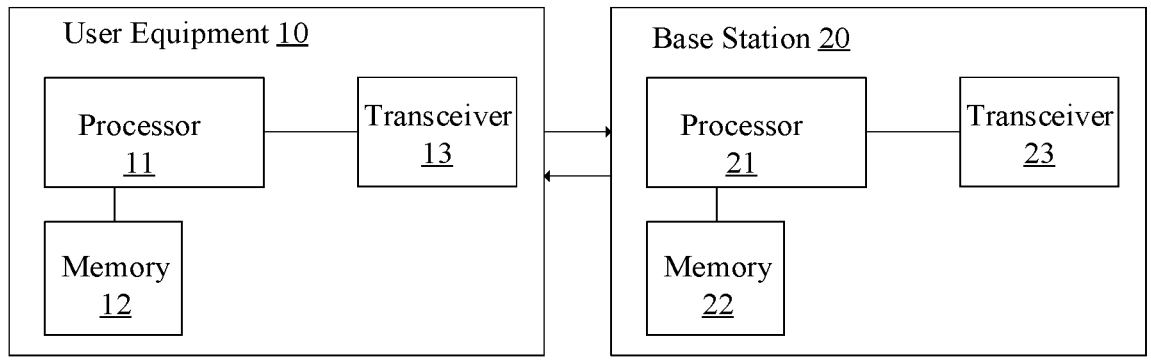
FIG. 1 is a block diagram of one or more user equipments (UEs) and a base station of communication in a communication network system according to an embodiment of the present disclosure.

FIG. 1 illustrates that, in some embodiments, one or more user equipments (UEs) 10 and a base station 20 of communication in a communication network system 30 according to an embodiment of the present disclosure are provided. The communication network system 30 includes the UE 10 and the base station 20 (such as a gNB). The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23.

The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond. Some embodiments of the present disclosure relate to mobile cellular communication technology in 3GPP NR Release 17 and beyond for providing multicast and broadcast services.

In some embodiments, the transceiver 13 is configured to receive a multicast broadcast service (MBS) transport block (TB) from the base station 20, the processor 11 is configured to decode the MBS TB, and the transceiver 13 transmits, to the base station 20, a hybrid automatic repeat request (HARQ) feedback in a form of a negative acknowledgement (NACK)-only report when the processor 11 incorrectly decodes the MBS TB. This can solve issues in the prior art, decrease a required number of feedback resources, save UE processing and uplink (UL) transmissions, provide more reliable reception of MBS data with lower latency, provide better user experience, provide a good communication performance, and/or provide high reliability.

In some embodiments, the transceiver 23 is configured to transmit, to the user equipment (UE) 10, a multicast broadcast service (MBS) transport block (TB) and the transceiver 23 receives, from the UE 10, a hybrid automatic repeat request (HARQ) feedback in a form of a negative acknowledgement (NACK)-only report when the UE 10 incorrectly decodes the MBS TB. This can solve issues in the prior art, decrease a required number of feedback resources, save UE processing and uplink (UL) transmissions, provide more reliable reception of MBS data with lower latency, provide better user experience, provide a good communication performance, and/or provide high reliability.

In some embodiments, the UE 10 is in a radio resource control (RRC) idle state and/or an RRC inactive state. In some embodiments, the transceiver 13 does not feedback, to the base station 20, any positive acknowledgement (ACK) report when the processor 11 successfully decodes the MBS TB. In some embodiments, the processor 11 is configured with a common uplink resource or a set of common uplink resources for being shared between the UE 10 and one or more UEs in the same cell as the UE 10. In some embodiments, the common uplink resource or the set of common uplink resources are configured to the processor using a cell specific network RRC signaling. In some embodiments, the common uplink resource or the set of common uplink resources comprises a physical random access channel (PRACH) resource and/or a random access (RA) preamble. In some embodiments, the RA preamble comprises a sequence-based RA preamble.

In some embodiments, the sequence-based RA preamble is used to represent NACK-only information, and the NACK-only information is used for the HARQ feedback in the form of the NACK-only report in the PRACH resource of a random access channel (RACH) occasion. In some embodiments, the HARQ feedback in the form of the NACK-only report in the PRACH resource of the RACH occasion corresponds to the best synchronization signal block (SSB) for the UE 10. In some embodiments, the processor 11 determines a SSB index and/or frame timing of the best SSB partly by a physical broadcast channel (PBCH) demodulation reference signal (DMRS) and/or PBCH data. In some embodiments, the transceiver 13 is configured to transmit a PRACH/RA preamble on a configured PRACH resource associated to the best SSB index and/or frame timing.

In some embodiments, an association between an SSB in a SS burst set, or a subset of PRACH resources and/or preamble indices is configured by a set of parameters in system information. In some embodiments, the transceiver 13 is configured to notify the base station 20 with the best SSB by transmitting the RA preamble using a corresponding RACH occasion (RO) and a common NACK-only PRACH resource for the best SSB. In some embodiments, the transceiver 13 is configured to receive a retransmission of the MBS TB from the base station 20. In some embodiments, the retransmission of the MBS TB is transmitted via a unicast physical downlink shared channel (PDSCH).

In some embodiments, the UE 10 is in a specific group associated with a detected RO/SSB beam. In some embodiments, one RO is a common PRACH resource/sequence for the HARQ feedback in the form of the NACK-only report and is shared/used by the UE 10 or one or one or more UEs in the same cell as the UE 10. In some embodiments, the processor 11 is configured to compute a transmit power for transmitting the RA preamble according to a downlink pathloss and a target received power of the RA preamble. In some embodiments, the target received power is configured by the base station 20. In some embodiments, a range of transmission power levels that correspond to different downlink reference signal received power (RSRP)-thresholds is configured by the base station 20, and the processor 11 selects a suitable power level from the range of transmission power levels for transmitting the HARQ feedback in the form of the NACK-only report according to a measured downlink RSRP level.

Figure 2:
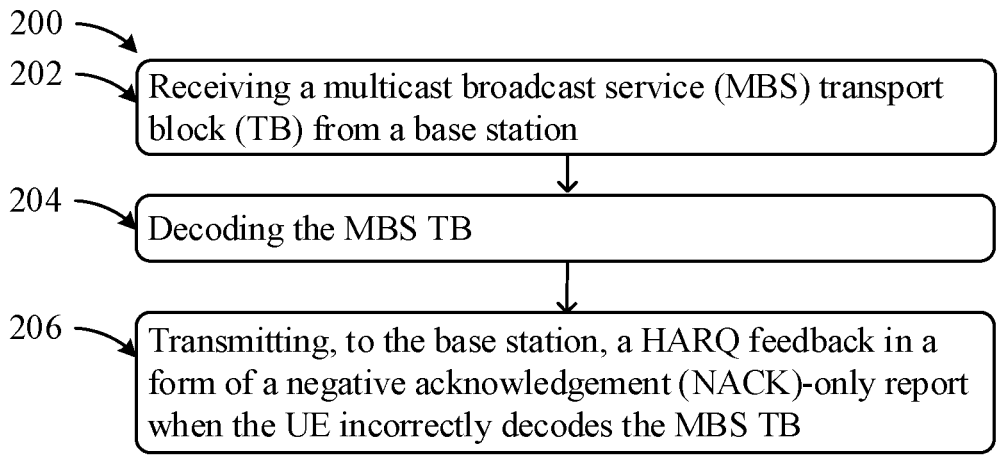
FIG. 2 is a flowchart illustrating a method for a hybrid automatic repeat request (HARQ) feedback transmission of a UE according to an embodiment of the present disclosure.

FIG. 2 illustrates a method 200 for a hybrid automatic repeat request (HARQ) feedback transmission of a user equipment according to an embodiment of the present disclosure. In some embodiments, the method 200 includes: a block 202, receiving a multicast broadcast service (MBS) transport block (TB) from a base station, a block 204, decoding the MBS TB, and a block 206, transmitting, to the base station, a HARQ feedback in a form of a negative acknowledgement (NACK)-only report when the UE incorrectly decodes the MBS TB. This can solve issues in the prior art, decrease a required number of feedback resources, save UE processing and uplink (UL) transmissions, provide more reliable reception of MBS data with lower latency, provide better user experience, provide a good communication performance, and/or provide high reliability.

Figure 3:
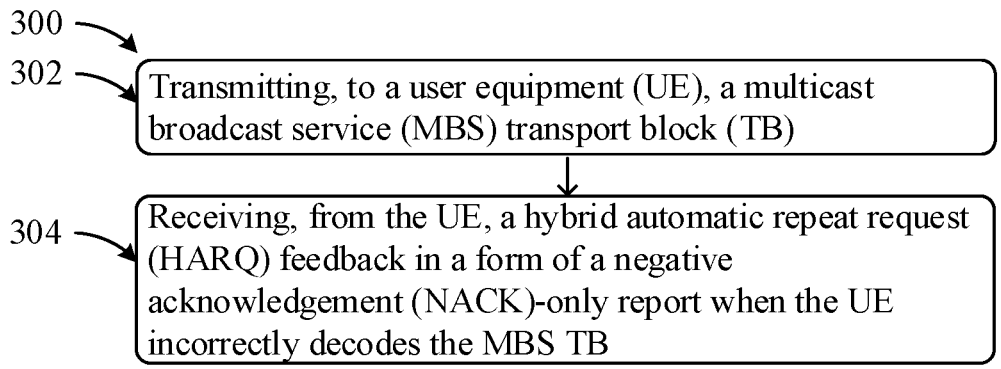
FIG. 3 is a flowchart illustrating a method for a hybrid automatic repeat request (HARQ) feedback transmission of a base station according to an embodiment of the present disclosure.

FIG. 3 illustrates a method 300 for a hybrid automatic repeat request (HARQ) feedback transmission of a base station according to an embodiment of the present disclosure. In some embodiments, the method 300 includes: a block 302, transmitting, to a user equipment (UE), a multicast broadcast service (MBS) transport block (TB), and a block 304, receiving, from the UE, a hybrid automatic repeat request (HARQ) feedback in a form of a negative acknowledgement (NACK)-only report when the UE incorrectly decodes the MBS TB. This can solve issues in the prior art, decrease a required number of feedback resources, save UE processing and uplink (UL) transmissions, provide more reliable reception of MBS data with lower latency, provide better user experience, provide a good communication performance, and/or provide high reliability.

In some embodiments, the UE is in a radio resource control (RRC) idle state and/or an RRC inactive state. In some embodiments, the UE does not feedback, to the base station, any positive acknowledgement (ACK) report when the UE successfully decodes the MBS TB. In some embodiments, the method further comprises being configured with a common uplink resource or a set of common uplink resources for being shared between the UE and one or more UEs in the same cell as the UE. In some embodiments, the common uplink resource or the set of common uplink resources are configured to the UE using a cell specific network RRC signaling. In some embodiments, the common uplink resource or the set of common uplink resources comprises a physical random access channel (PRACH) resource and/or a random access (RA) preamble. In some embodiments, the RA preamble comprises a sequence-based RA preamble.

In some embodiments, the sequence-based RA preamble is used to represent NACK-only information, and the NACK-only information is used for the HARQ feedback in the form of the NACK-only report in the PRACH resource of a random access channel (RACH) occasion. In some embodiments, the HARQ feedback in the form of the NACK-only report in the PRACH resource of the RACH occasion corresponds to the best synchronization signal block (SSB) for the UE. In some embodiments, the method further comprises determining a SSB index and/or frame timing of the best SSB partly by a physical broadcast channel (PBCH) demodulation reference signal (DMRS) and/or PBCH data. In some embodiments, the method further comprises transmitting a PRACH/RA preamble on a configured PRACH resource associated to the best SSB index and/or frame timing. In some embodiments, an association between an SSB in a SS burst set, or a subset of PRACH resources and/or preamble indices is configured by a set of parameters in system information.

In some embodiments, the method further comprises notifying the base station with the best SSB by transmitting the RA preamble using a corresponding RACH occasion (RO) and a common NACK-only PRACH resource for the best SSB. In some embodiments, the method further comprises receiving a retransmission of the MBS TB from the base station. In some embodiments, the retransmission of the MBS TB is transmitted via a unicast physical downlink shared channel (PDSCH). In some embodiments, the UE is in a specific group associated with a detected RO/SSB beam. In some embodiments, one RO is a common PRACH resource/sequence for the HARQ feedback in the form of the NACK-only report and is shared/used by the UE or one or one or more UEs in the same cell as the UE.

In some embodiments, the method further comprises computing a transmit power for transmitting the RA preamble according to a downlink pathloss and a target received power of the RA preamble. In some embodiments, the target received power is configured by the base station. In some embodiments, a range of transmission power levels that correspond to different downlink reference signal received power (RSRP)-thresholds is configured by the base station, and the UE selects a suitable power level from the range of transmission power levels for transmitting the HARQ feedback in the form of the NACK-only report according to a measured downlink RSRP level.

In some embodiments, in the present disclosure of an inventive method for a user equipment (UE) in radio resource control (RRC) idle or inactive state (or even in connected state) to provide hybrid automatic repeat request (HARQ) feedback to its camping or abase station (such as serving cell gNodeB (gNB)) in a 5th generation—new radio (5G-NR) network, the UE sends negative acknowledgement (NACK) reports only for incorrectly decoded transport blocks (TBs) carried in physical downlink shared channel (PDSCH). For the proposed NACK-only based HARQ reporting scheme, the UE does not send back any other HARQ reports such as acknowledgement (ACK) or during the discontinuous transmission (DTX) to its serving/camping gNB even when PDSCH packet TBs are decoded successfully or when the UE completely misses or failed to decode the data scheduling downlink control information (DCI). As such, the main purpose of NACK-only reporting from at least the RRC idle/inactive UE is to indicate to the gNB that it has failed to decode the last transmitted TB in the downlink (DL).

Since the number of RRC idle and inactive UEs receiving the same MBS TBs could be very high and even unpredictable, it is not important or sometimes impossible to accurately count the number of NACK reports that it has received or the number of UEs that have provided their HARQ feedbacks. For the gNB to provide MBS services and to fulfil service requirements, it is sufficient for the gNB to estimate only a rough percentage or portion of UEs that has failed to decode the transmitted MBS TB in the DL and provide retransmission(s) of the same TB if the estimated percentage is higher than the requirement.

In one embodiment of the present invention, the method for a UE to provide its NACK feedback report for an unsuccessful/failure decoded MBS TB received in PDSCH (e.g. when the cyclic redundancy check (CRC) of the associated scheduling DCI is scrambled by a groupcast-radio network temporary identifier (G-RNTI)) is to select and transmit a random-access (RA) preamble using physical random access channel (PRACH) to the network/its camping or serving gNB. The UE does not send a positive acknowledgement (ACK) response in case of successful decoding due to the gNB only needs to know whether it should retransmit the same MBMS TB in the downlink. Therefore, even with just one NACK is transmitted and received by the gNB, the same TB could be retransmitted again.

In some embodiments, the method to select a RA preamble by the UE is to first identify the best synchronization signal block (SSB) within a synchronization signal (SS) burst set by measuring downlink reference signal received power (RSRP) using primary synchronization signal (PSS), secondary synchronization signal (SSS) and/or physical broadcast channel (PBCH) demodulation reference signal (DMRS). The SSB that corresponds to the highest downlink RSRP measured is the best SSB for the UE, and its associated SSB index/transmit beam. By using the RA channel occasion (RO) associated with this SSB index/beam and transmitting the RA preambles configured by the network gNB, the UE will be able to notify its gNB the NACK response for the MBS TB received on this beam.

In turn, the gNB will also have the knowledge of the beam that was used for the last failure decoded MBS TB, and subsequently provide retransmission of the same MBS TB on the same beam to the UE. In details, the UE determines a SSB index and/or frame timing of the best SSB partly by the PBCH DMRS and/or the PBCH data. The UE transmits PRACH/RA preamble on a configured PRACH resource associated to the best SSB index and/or frame timing. An association between an SSB in the SS burst set and a subset of PRACH resources and/or preamble indices is configured by a set of parameters in the system information. The UE notifies the gNB with the best SSB by transmitting a RA preamble using the corresponding RO and the common NACK-only PRACH resource for that SSB. The gNB may perform retransmission of MBS data TB via downlink unicast DL-SCH (PDSCH) to a specific group of UEs that are associated with the detected RO/SSB beam. The one RO is a common PRACH resource/sequence for NACK-only HARQ reporting and can shared/used by one or multiple UEs.

In another embodiment of the present invention, methods for an RRC idle/inactive UE to determine its power level to transmit HARQ feedback report for a selected PRACH resource and RA preamble are proposed. In a normal operation of a 5G-NR cellular communication network, a power control command (PCC) is provided individually to RRC connected UEs in a network cell for almost all of their signal and channel transmissions in the UL (except for physical random access channel) so that the reception power at the gNB among the different transmitting UEs is at a similar level to avoid in-band emission (IBE) interference between adjacent frequency RBs and inter-UE interference when they are code division multiplexed (CDMed), which is particularly important for the proposed HARQ feedback when the gNB tries to count number of NACK reports based on the total received power per PRACH resource. In order to ensure an appropriate power level is used to transmit HARQ feedback for RRC idle/inactive UEs, one or a combination of more than one of the following methods to suit different operating scenarios should be utilized.

In some embodiments, a method of open-loop power control based: Since RRC idle/inactive UEs do not transmit any signal and channel in the UL (except for mobility location updates), if an idle/inactive state UE does not move out of its current service location area, the UE will not receive any power control command directly from the camping/serving gNB while in the idle and inactive states. Without the explicit indication of power level from the gNB for UL transmissions, an RRC idle/inactive UE derives transmit power level for the HARQ feedback reporting based on an open-loop power control (OLPC) scheme. In some embodiments, in the proposed OLPC for the HARQ feedback reporting, gNB configures a target received power for the RA preamble. The UE based on the knowledge of the target received power (X) and an estimated downlink pathloss (Y) measured based on the best SSB, it determines/ derives/computes the power that it should use to transmit the RA preamble to the gNB by simply using (X+Y). This can provide accurate power.

In some embodiments, a method of RSRP threshold based: As an alternative to the above target received power based OLPC method, RSRP-threshold based derivation to determine Tx power for transmitting RA preambles could be used. In the RSRP-threshold based scheme, a range of transmission power levels that correspond to different RSRP-thresholds is configured to the UE via a cell-common RRC configuration, and the UE selects a suitable power level from the indicated power range for transmitting HARQ feedback report according to its measured downlink RSRP level.

In some embodiments, network configuration details are provided as followings.

Cell specific random-access parameter configuration via network RRC for HARQ reporting (common for all UEs in a cell) includes one or more of the followings.

1. Subcarrier spacing (SCS) of PRACH and/or BWP information. 2. Time and frequency information for each RACH occasion and/or the PRACH resource. 3. Number of RA preambles per SSB. 4. PRACH format, preamble sequences and/or root sequence index. 5. Information relating to mapping of PRACH resource/RA preambles to Groupcast-RNTI (G-RNTI). 6. RSRP threshold for UE selection of SSB and corresponding PRACH for path-loss estimation and (re)transmission based on SS blocks that satisfy the threshold. 7. Target received power for the RA preamble. 8. Power offset/thresholds for preamble power setting.

In summary, in some embodiments, in order for a 5G-NR gNB to provide necessary retransmission(s) of a downlink MBS TB to at least UEs in RRC idle and/or inactive states, HARQ feedback in a form of NACK-only report from incorrectly decoded UE(s) should be sent to the gNB. That is, a UE does not feedback any ACK report when the received TB is decoded successfully to minimize the required number of feedback resources and to save UE processing and UL transmissions. To further improve utilization efficiency of UL resources for the system, a common or a set of common uplink resources are to be shared among MBS receiving UEs, i.e. PRACH resources and RA preambles are configured to the UEs using a cell specific network RRC signaling. To simplify receiver detection process at the gNB, a sequence-based RA preamble to represent NACK-only information is utilized to feedback HARQ reports in a PRACH resource of a RACH occasion (RO) corresponding to the best SSB for the UE. The UE determines the SSB index and/or frame timing of the best SSB partly by the PBCH DMRS and/or the PBCH data. The UE transmits PRACH/RA preamble on a configured PRACH resource associated to the best SSB index and/or frame timing. An association between an SSB in the SS Burst Set and a subset of PRACH resources and/or preamble indices is configured by a set of parameters in the system information. The UE notifies the gNB with the best SSB by transmitting a RA preamble using the corresponding RO and the common NACK-only PRACH resource for that SSB. The gNB may perform retransmission of MBS data TB via downlink unicast DL-SCH (PDSCH) to a specific group of UEs that are associated with the detected RO/SSB beam. The one RO is a common PRACH resource/sequence for NACK-only HARQ reporting and can shared/used by one or multiple UEs.

In summary, in some embodiments, in order to ensure appropriate power level is used by all HARQ reporting UEs so that the reception power of their transmitted sequences at the gNB are at a similar level, one or a combination of the following methods should be utilized to suit different operating scenarios. Open loop power control based method: Based on a network configured target received power at the gNB and an estimated DL pathloss at the UE, the UE computes the transmit power for transmitting RA preambles as DL pathloss and target received power. RSRP threshold based method: A range of transmission power levels that correspond to different RSRP-thresholds is configured, and the UE selects a suitable power level from the indicated power range for transmitting HARQ feedback report according to its measured downlink RSRP level.

Commercial interests for some embodiments are as follows. 1. Solving issues in the prior art. 2. Decreasing a required number of feedback resources. 3. Saving UE processing and uplink (UL) transmissions. 4. Providing more reliable reception of MBS data with lower latency. 5. Providing better user experience. 6. Providing good communication performance. 7. Providing high reliability. 8. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 4:
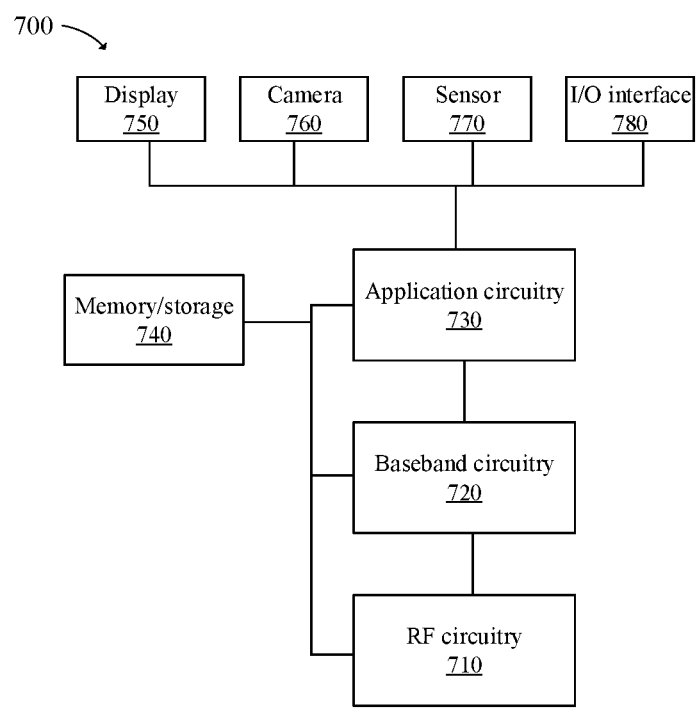
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE), comprising:
a memory;
a transceiver; and
a processor coupled to the memory and the transceiver; wherein:
the transceiver is configured to receive a multicast broadcast service (MBS) transport block (TB) from a base station;
the processor is configured to decode the MBS TB; and
the transceiver transmits, to the base station, a hybrid automatic repeat request (HARQ) feedback in a form of a negative acknowledgement (NACK)-only report responsive to determining that the processor incorrectly decodes the MBS TB,
wherein the processor is configured with a set of common uplink resources for being shared between the UE and one or more UEs, and the transceiver does not feedback, to the base station, any positive acknowledgement (ACK) report responsive to determining that the processor successfully decodes the MBS TB,
wherein the set of common uplink resources is configured to the processor using a cell specific network radio resource control (RRC) signaling.

2. The UE of claim 1, wherein the UE is in an RRC idle state and/or an RRC inactive state.

3. The UE of claim 1, wherein the set of common uplink resources comprises a physical random access channel (PRACH) resource and/or a random access (RA) preamble.

4. The UE of claim 3, wherein the RA preamble comprises a sequence-based RA preamble.

5. The UE of claim 4, wherein the sequence-based RA preamble is used to represent NACK-only information, and the NACK-only information is used for the HARQ feedback in the form of the NACK-only report in the PRACH resource of a random access channel (RACH) occasion.

6. The UE of claim 5, wherein the HARQ feedback in the form of the NACK-only report in the PRACH resource of the RACH occasion corresponds to the best synchronization signal block (SSB) for the UE.

7. A method for a hybrid automatic repeat request (HARQ) feedback transmission of a user equipment (UE), comprising:
receiving a multicast broadcast service (MBS) transport block (TB) from a base station;
decoding the MBS TB; and
transmitting, to the base station, a HARQ feedback in a form of a negative acknowledgement (NACK)-only report responsive to determining that the UE incorrectly decodes the MBS TB,
wherein the method further comprises being configured with a set of common uplink resources for being shared between the UE and one or more UEs, and the UE does not feedback, to the base station, any positive acknowledgement (ACK) report responsive to determining that the UE successfully decodes the MBS TB,
wherein the set of common uplink resources is configured to the UE using a cell specific network radio resource control (RRC) signaling.

8. The method of claim 7, wherein the UE is in an RRC idle state and/or an RRC inactive state.

9. The method of claim 7, wherein the set of common uplink resources comprises a physical random access channel (PRACH) resource and/or a random access (RA) preamble.

10. The method of claim 9, wherein the RA preamble comprises a sequence-based RA preamble.

11. A base station, comprising:
a memory;
a transceiver; and
a processor coupled to the memory and the transceiver; wherein:
the transceiver is configured to transmit, to a user equipment (UE), a multicast broadcast service (MBS) transport block (TB); and
the transceiver receives, from the UE, a hybrid automatic repeat request (HARQ) feedback in a form of a negative acknowledgement (NACK)-only report responsive to determining that the UE incorrectly decodes the MBS TB,
wherein the processor configures, to the UE, a set of common uplink resources for being shared between the UE and one or more UEs, and the UE does not feedback, to the base station, any positive acknowledgement (ACK) report responsive to determining that the UE successfully decodes the MBS TB,
wherein the set of common uplink resources is configured to the UE using a cell specific network radio resource control (RRC) signaling.

12. The base station of claim 11, wherein the UE is in an RRC idle state and/or an RRC inactive state.

13. The base station of claim 11, wherein the set of common uplink resources comprises a physical random access channel (PRACH) resource and/or a random access (RA) preamble.

14. The base station of claim 13, wherein the RA preamble comprises a sequence-based RA preamble.

15. The base station of claim 14, wherein the sequence-based RA preamble is used to represent NACK-only information, and the NACK-only information is used for the HARQ feedback in the form of the NACK-only report in the PRACH resource of a random access channel (RACH) occasion.

16. The base station of claim 15, wherein the HARQ feedback in the form of the NACK-only report in the PRACH resource of the RACH occasion corresponds to the best synchronization signal block (SSB) for the UE.

17. A method for a hybrid automatic repeat request (HARQ) feedback transmission of a base station, comprising:
transmitting, to a user equipment (UE), a multicast broadcast service (MBS) transport block (TB); and
receiving, from the UE, a hybrid automatic repeat request (HARQ) feedback in a form of a negative acknowledgement (NACK)-only report responsive to determining that the UE incorrectly decodes the MBS TB,
wherein the method further comprises configuring, to the UE, a set of common uplink resources for being shared between the UE and one or more UEs, and the UE does not feedback, to the base station, any positive acknowledgement (ACK) report responsive to determining that the UE successfully decodes the MBS TB,
wherein the set of common uplink resources is configured to the UE using a cell specific network radio resource control (RRC) signaling.

18. The method of claim 17, wherein the UE is in an RRC idle state and/or an RRC inactive state.

19. The method of claim 17, wherein the set of common uplink resources comprises a physical random access channel (PRACH) resource and/or a random access (RA) preamble.

20. The method of claim 19, wherein the RA preamble comprises a sequence-based RA preamble.

\* \* \* \* \*